United States Patent
Stehlin et al.

[11] 3,781,680
[45] Dec. 25, 1973

[54] DIFFERENTIAL METHOD OF PHOTOCURRENT MEASUREMENT

[75] Inventors: Robert A. Stehlin; Hilton W. Spence; Walter T. Matzen, all of Richardson, Tex.

[73] Assignee: The United States of America as represented by the Secretary of the Air Force, Washington, D.C.

[22] Filed: Nov. 16, 1971

[21] Appl. No.: 199,211

[52] U.S. Cl. .......................... 324/123 R, 324/158 D
[51] Int. Cl. ......................... G01r 1/30, G01r 31/26
[58] Field of Search................ 324/123, 121, 158 D, 324/158 R; 356/215, 225

[56] References Cited
UNITED STATES PATENTS

| | | | |
|---|---|---|---|
| 3,464,773 | 9/1969 | Waz..................................... | 356/215 |
| 3,518,438 | 6/1970 | Hart et al............................. | 356/223 |
| 3,528,350 | 9/1970 | Schmitt............................... | 356/222 |
| 3,664,752 | 5/1972 | Hermieu.............................. | 356/224 |

Primary Examiner—Rudolph V. Rolinec
Assistant Examiner—Ernest F. Karlsen
Attorney—Harry A. Herbert, Jr.

[57] ABSTRACT

A differential amplifier circuit for measuring radiation induced photocurrents in small geometry semiconductor devices.

2 Claims, 6 Drawing Figures

DIFFERENTIAL METHOD OF PHOTOCURRENT MEASUREMENT

BACKGROUND OF THE INVENTION

When an electronic device utilizing semiconductors is operated in an environment which is subjected to radiation such as gamma rays, hole electron pairs are generated within the semiconductor material. These carriers move by diffusion and drift to and through the semiconductor junctions. The effect of these carriers passing through the semiconductor junction is to produce transient photocurrents. The current components which enter the base region are called the primary photocurrents. The major component of primary photocurrent is produced in the collector region and in the transition region of the collector-base junction. The emitter component of the primary photocurrent is, in general, substantially smaller than the major component of the primary photocurrent. The short diffusion length which is utilized in the emitter contributes to the smaller emitter component of the primary photocurrent.

In the prior art, the measurement of photocurrents in semiconductor circuits was at best very difficult and subject to gross discrepancies. This is due to the fact that the instruments or devices which are utilized to make the photocurrent measurements are themselves subjected to and affected by the radiation conditions that produce the photocurrents in the semiconductor devices. The present invention provides a method of photocurrent measurement which are simple and accurate. The adverse affects which are associated with the operation of electronic equipment in a radiation environment have been eliminated in the present measurement technique.

SUMMARY OF THE INVENTION

The present invention utilizes a differential amplifier to measure the photocurrents which are generated in a test device that is operated in a radiation environment or subjected to some form of radiation. The differential amplifier test circuit is calibrated in a simulated radiation environment without the test device connected to the differential test circuit. The calibration establishes a base line against which the photocurrent measurement will be compared. The test device is connected to the differential amplifier test circuit and the response of the combination is recorded. The difference between the two responses represents the photocurrents which are generated in the test device.

It is one object of the invention, therefore, to provide an improved photocurrent measurement apparatus utilizing a differential amplifier circuit to provide an accurate and reliable photocurrent measurement.

It is another object of the invention to provide an improved photocurrent measurement apparatus having the capability of measuring photocurrents in a test device in a simulated radiation environment.

These and other advantages, features and objects of the invention will become more apparent from the following description taken in conjunction with the illustrative embodiment in the accompanying drawings.

DETAILED DESCRIPTION OF THE PREFERRED EMBODIMENT

Figure 1:
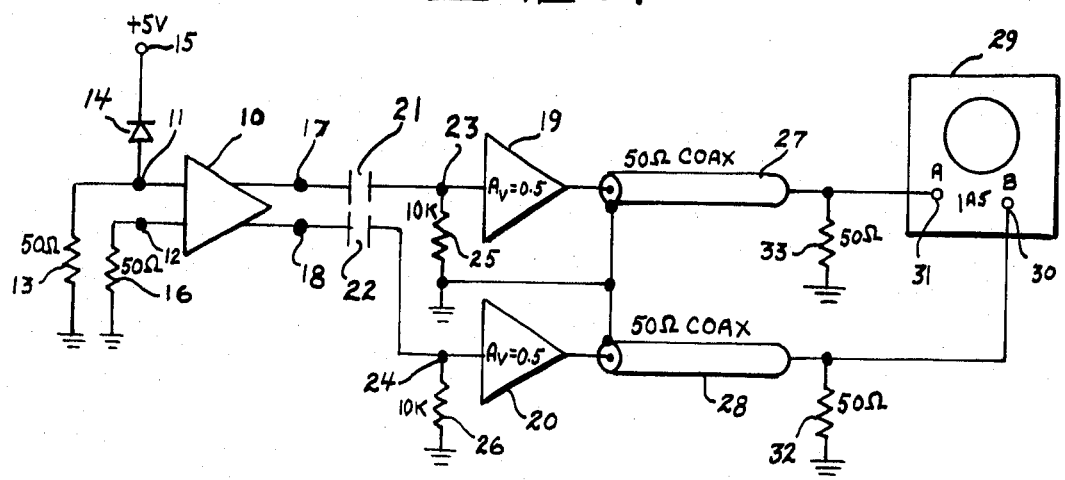
FIG. 1 is a schematic diagram of the differential amplifier photocurrent measurement circuit in accordance with the invention.

Referring now to FIG. 1, there is shown a photocurrent measurement circuit utilizing a differential amplifier 10. The differential amplifier 10 has first and second input terminals, 11 and 12. The first input terminal 11 is connected to a 50 ohm terminating resistor 13 and the device under test 14 (diode). The diode 14 is connected to a + 5 volt power supply voltage which is applied at terminal 15. The second input terminal 12 is connected to a 50 ohm terminating resistor 16. The test device 14 is connected to the first input terminal 11 during the measurement of the photocurrents which are generated within the test device. The differential amplifier 10 has a pair of output terminals, 17, 18. The output signals of the differential amplifier 10 appear on output terminals 17, 18 and are coupled, respectively, to amplifiers 19, 20 by capacitors 21, 22. The input terminal 23 of amplifier 19 has a terminating resistor 25 connected therebetween to ground. A terminating resistor 26 is also provided between input terminal 24 of amplifier 20 to ground. The output signals from amplifiers 19, 20 are applied through coax cables 27, 28 to a measurement apparatus. The measurement apparatus which is shown in the present embodiment is an oscilloscope 29. The oscilloscope 29 may be any commercially available apparatus having a 50 MHtz response, such as a Tektronixs, model 547 with a 1A5 differential comparator amplifier plug in unit. The Tektronix scope is manufactured by Tektronix Inc, Beaverton, Oregon, 97005. The oscilloscope 29 has a pair of terminals 30, 31 to which coax cables 27, 28 are respectively connected. The terminals 30 and 31 are labeled A and B on the Tektroxix plug-in unit, model 1A5 (shown in FIG. 1). Any signals applied to terminals A and B are differenced and the result shown on the scope screen. Neither terminal A or B is referenced to ground. The output end of coax cable 27 is terminated with a 50 ohm terminating resistor 33 to ground. The output end of coax cable 28 is likewise terminated with a 50 ohm terminating 32 to ground.

The photocurrent measurement of a test device is accomplished in the following manner. The present photocurrent measurement depends upon calibrating the differential amplifier circuit which is shown in FIG. 1 without connecting the test device to the input terminal 11. The differential amplifier 10 has no amplifier input leads which may be connected to the header or other system wiring. The device to be tested is built on the same chip. The differential amplifier 10 is completely free of any unnecessary external connections which may create inaccuracies or errors in the photocurrent measurement. The differential amplifier 10 test circuit while operating without a test device connected is calibrated in a simulated radiation environment. The positive 5 volt voltage which is applied to terminal 15 is supplied to differential amplifier 10 to provide a base line on oscilloscope 29. Since there is no test device connected to input terminal 11 of differential amplifier 10, the base line established by the positive 5 volt voltage may be superimposed upon the photo-current response which appears on the oscilloscope 29. Thus, after the initial calibration of the differential amplifier 10 test circuit in the simulated radiation environment, the test device 14 is connected to the differential amplifier 10 with a small ($\approx$ 2 mils) internal jumper. The modified differential amplifier test circuit with the test device connected to the input terminal 11 is again exposed to the simulated radiation environment. The photocurrents which are generated within the test device are applied through the differential amplifier 10, amplifiers 19, 20 and coax line 27 and 28 to terminal 30 and 31 of oscilloscope 29. The base line which established the photo-currents within the test circuit without the test device connected, now provides a reference point from which the photocurrents which are generated within the test device may be measured. The difference between the two responses is related to the photocurrent of the test device by the following formula:

$I_{pp} \approx \Delta V_{out}/R_{13} X$ Gain; where $\Delta V_{out}$ is the change in the voltage out, $R_{13}$ is the resistor which is connected from the test device input terminal to ground, and Gain is the gain of the differential amplifier.

Figure 2:
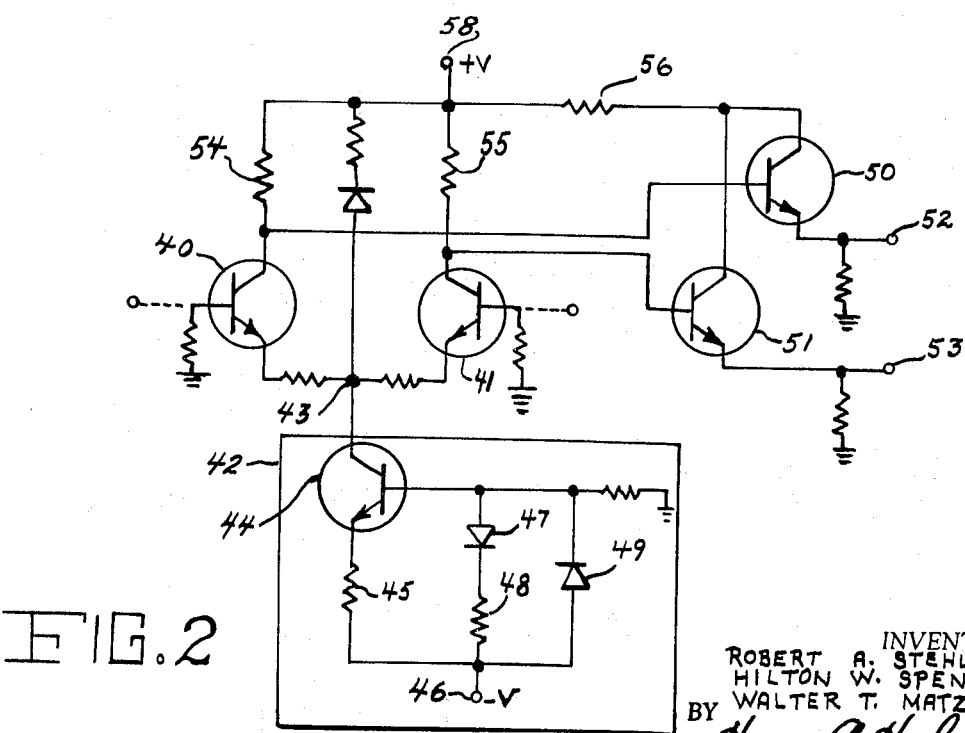
FIG. 2 is a schematic diagram of the differential amplifier which is utilized in the photocurrent measurement circuit.

Turning now to FIG. 2, there is shown a schematic diagram of the differential amplifier which was utilized in the photocurrent measurement test circuit of FIG. 1. The circuit is comprised of two transistors 40, 41 which have their emitters respectively connected and are operated in the differential amplifier circuit configuration. A constant current source 42 is connected to the common emitter point 43 between the two transistors 40, 41. The constant current source 42 comprises a transistor 44 having its collector connected to the common emitter point 43 and its emitter connected through a resistor 45 to the negative input voltage supply terminal 46. The base of transistor 44 is connected to the negative input voltage supply terminal 46 by a parallel circuit comprising diode 47 and resistor 48 in parallel with diode 49. Diodes 47 and 49 are connected in opposite polarity with respect to each other between the base of transistor 44 and the negative input voltage supply terminal 46. The output signals from transistors 40, 41 are taken from the respective collectors and connected to the respective bases of transistors 50, 51. The transistors 50, 51 are operated in the emitter follower circuit configuration. The output signals from the transistors 50, 51 appear at the respective emitters of transistors 50, 51 and are applied to output terminals 52, 53 respectively. The collectors of transistors 40, 41, 50, 51 are connected through resistors 54, 55 and 56 respectively to the positive input voltage supply terminal 58.

Figure 3:
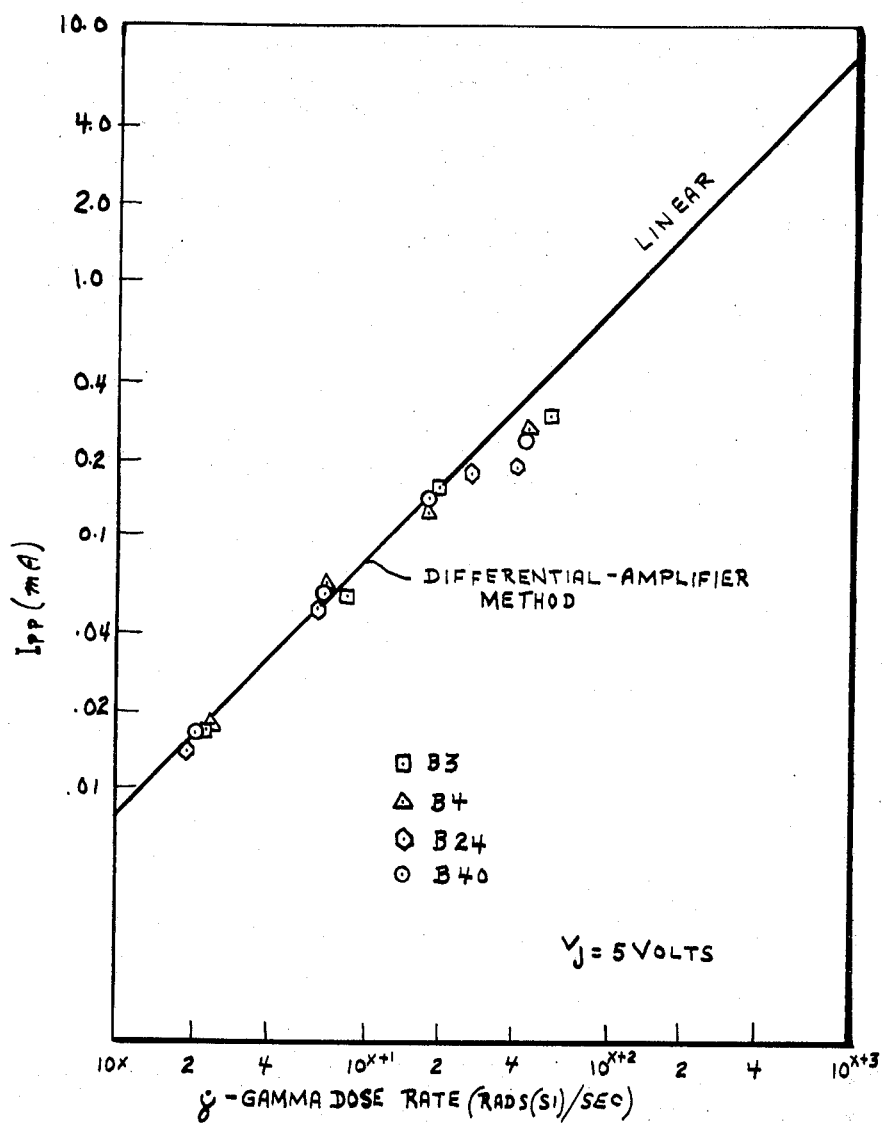
FIG. 3 is a graphical plot of test results of photocurrents measured in a test device versus radiation dose rate.
Figure 4A:
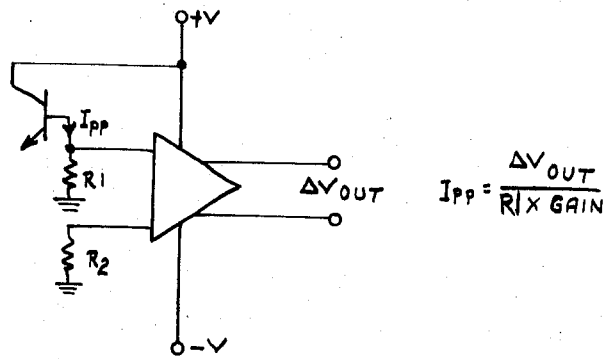
FIG. 4a is a block diagram of the basic photocurrent measurement circuit.
Figure 4B:
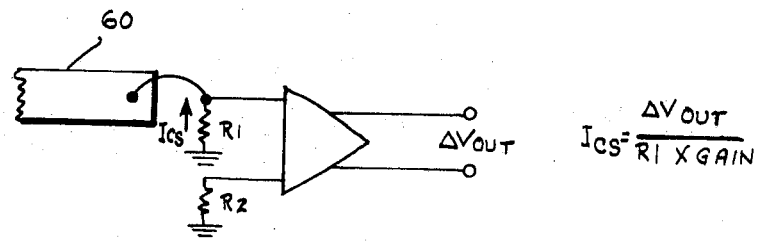
FIG. 4b is a block diagram of a charge scattering measurement circuit.
Figure 4C:
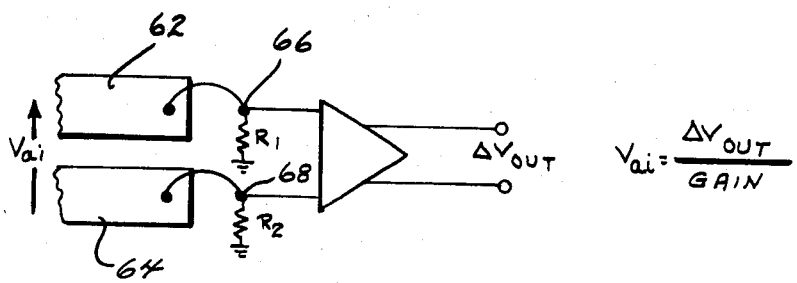
FIG. 4c is a block diagram of an air ionization potential measurement circuit.

The results which have been obtained by utilizing the differential amplifier test circuit (shown in FIG. 1) to measure photocurrents in a test device are shown in FIG. 3. The photo-current, $I_{pp}$ is shown plotted against the gamma dose rate, $\gamma$. The absolute value agrees substantially with the theory and a linear slope is obtained. The differential amplifier has been illustrated in an embodiment by which photocurrents may be accurately measured. The differential amplifier may be utilized in other circuit configurations to measure other radiation parameters. A few of these are shown in FIGS. 4a through 4c. FIG. 4a illustrates the basis block of the differential amplifier test circuit which was shown in detail in FIG. 1. FIG. 4b illustrates how the differential amplifier may be arranged to receive an input signal from a metallic conductor 60. This circuit configuration provides a charge scattering measurement circuit. The charge scatter current is given by the formula:

$$I_{cs} = \Delta V_{out}/R_1 X \text{ Gain}.$$

FIG. 4c illustrates a circuit configuration utilizing the differential amplifier to provide an air ionization potential measurement circuit. A pair of metallic conductors, 62, 64 are respectively connected to the first and second input terminals 66, 68 respectively, of the differential amplifier. The air ionization potential is given by the formula:

$$V_{ai} = \Delta V_{out}/\text{Gain}.$$

Although the invention has been described with reference to a particular embodiment, it will be understood to those skilled in the art that the invention is capable of a variety of alternative embodiments within the spirit and scope of the appended claims.

We claim:

1. A differential amplifier test circuit for measuring the photocurrents which are generated within a test device operating in a simulated radiation environment comprising in combination:

a differential amplifier having a first and second input terminal and a first and second output terminal, said first input terminal being connected through the device to be tested to a positive power supply voltage terminal, said first input terminal having a terminating resistor connected therebetween to ground, said second input terminal having a terminating resistor connected therebetween to ground, a first amplifier being coupled to said first output terminal of said differential amplifier, said first amplifier having an input and an output terminal, said input terminal having a terminating resistor connected therebetween to ground, said output terminal being connected to one end of a 50 ohm coax cable, said coax cable having a shield, said shield being grounded at the amplifier end, a second amplifier being coupled to said second output terminal of said differential amplifier, said second amplifier having an input and an output terminal, said input terminal having a terminating resistor connected therebetween to ground, said output terminal being connected to one end of a 50 ohm coax cable, said coax cable having a shield, said shield being grounded at the amplifier end, and, an oscilloscope having a first and second input terminal, said first input terminal being connected to the other end of said first amplifier coax cable, said first input terminal having a terminating resistor connected therebetween to ground, said second input terminal being connected to the other end of said second amplifier coax cable, said second input terminal having a terminating resistor connected therebetween to ground.

2. A differential amplifier test circuit as described in claim 1 wherein said differential amplifier comprises:
- a first and second transistor having their emitters connected, said first transistor base being said first input terminal, said second transistor base being said second input terminal,
- a constant current source connected to said emitters of said first and second transistors, said constant current source being connected to a negative power supply voltage terminal,
- a first emitter follower transistor having its base connected to the collector of said first transistor, said first emitter follower transistor having an emitter, said emitter having a terminating resistor connected therebetween to ground, said emitter being said first output terminal, and,
- a second emitter follower transistor connected to the collector of said second transistor, said second emitter follower transistor having an emitter, said emitter having a terminating resistor connected therebetween to ground, said emitter being said second output terminal, said collectors of said first and second transistors being connected to a positive power supply voltage terminal, said first and second emitter follower transistors having their respective collectors connected to said positive power supply voltage terminal.

* * * * *